(12) United States Patent
Rozman et al.

(10) Patent No.: US 9,276,401 B2
(45) Date of Patent: Mar. 1, 2016

(54) SOLID STATE CIRCUIT-BREAKER SWITCH DEVICES

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 221 days.

(21) Appl. No.: 13/930,871

(22) Filed: Jun. 28, 2013

(65) Prior Publication Data

US 2015/0002975 A1    Jan. 1, 2015

(51) Int. Cl.
   H02H 3/00   (2006.01)
   H02H 9/04   (2006.01)
   H02H 3/02   (2006.01)
   H02H 7/22   (2006.01)

(52) U.S. Cl.
   CPC .............. *H02H 9/047* (2013.01); *H02H 3/021* (2013.01); *H02H 7/222* (2013.01)

(58) Field of Classification Search
   CPC ................................. H02H 9/047; H02H 3/021
   See application file for complete search history.

(56) References Cited

U.S. PATENT DOCUMENTS

| | | | |
|---|---|---|---|
| 3,517,300 A * | 6/1970 | McMurray | 363/25 |
| 3,553,554 A * | 1/1971 | Risberg | 318/257 |
| 3,662,250 A * | 5/1972 | Piccone et al. | 363/51 |
| 5,202,820 A | 4/1993 | Miller et al. | |
| 5,404,091 A * | 4/1995 | Radun | 322/94 |
| 5,903,121 A | 5/1999 | Heine et al. | |
| 6,956,238 B2 * | 10/2005 | Ryu et al. | 257/77 |
| 7,132,808 B1 * | 11/2006 | Thexton et al. | 318/251 |
| 7,372,432 B2 * | 5/2008 | Lee | 345/60 |
| 7,564,147 B2 | 7/2009 | Michalko | |
| 7,777,600 B2 * | 8/2010 | Brooks | 335/100 |
| 8,390,151 B2 | 3/2013 | Rozman et al. | |
| 2011/0013438 A1 | 1/2011 | Frisch et al. | |
| 2011/0286141 A1 | 11/2011 | Rozman et al. | |
| 2012/0007425 A1 | 1/2012 | Rozman et al. | |
| 2013/0050880 A1 | 2/2013 | Rozman et al. | |
| 2013/0050890 A1 | 2/2013 | Rozman et al. | |

FOREIGN PATENT DOCUMENTS

EP    0790699 A2    8/1997

OTHER PUBLICATIONS

U.S. Appl. No. 13/454,554.
U.S. Appl. No. 13/404,522.
U.S. Appl. No. 13/557,783.

(Continued)

*Primary Examiner* — Tien Mai
(74) *Attorney, Agent, or Firm* — Locke Lord LLP; Christopher J. Cillié; Scott D. Wofsy

(57) ABSTRACT

A solid state circuit-breaker switch has a first solid state switch coupled to a positive terminal of a high voltage source, a second solid state switch coupled to a return terminal of the high voltage source, and a diode connected between the switches. A load is coupled between the switches and in parallel with the diode such that voltage transients across the load are limited during turn of conditions. Related methods of operating the switch during turn-on and turn-off events within rated current operation are described, as are turn-on and turn-off events in overload conditions.

14 Claims, 9 Drawing Sheets

(56) References Cited

OTHER PUBLICATIONS

Search Report and Opinion issued by the European Patent Office on Dec. 11, 2014 for European Patent application No. 14174608.
Liccar, E.; Inductive Flyback Clamp Circuit with Reverse Polarity Protection; Motorola Inc. Technical Developments, Jun. 1993, pp. 127-128, vol. 19, Motorola Inc. Schaumburg, Illinois, US.

Arun Kadavelugu, et al; Zero Voltage Switching Performance of 1200V SiC MOSFET, 1200V Silicon IGBT and 900V CoolMOS MOSFET; Energy Conversion Congress and Exposition (ECCE), Sep. 17, 2011, pp. 1819-1826, Phoenix, AZ, US.

* cited by examiner

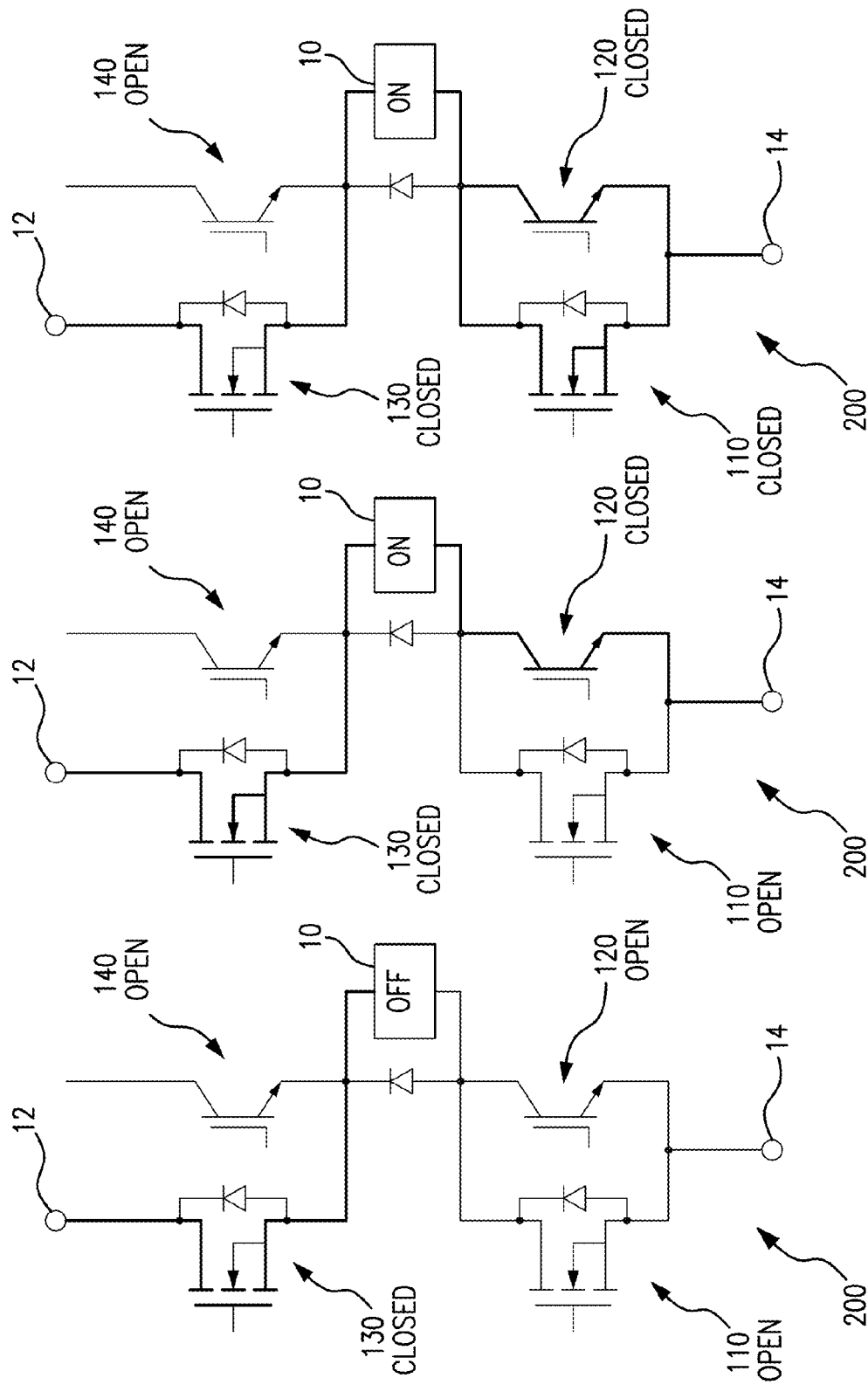

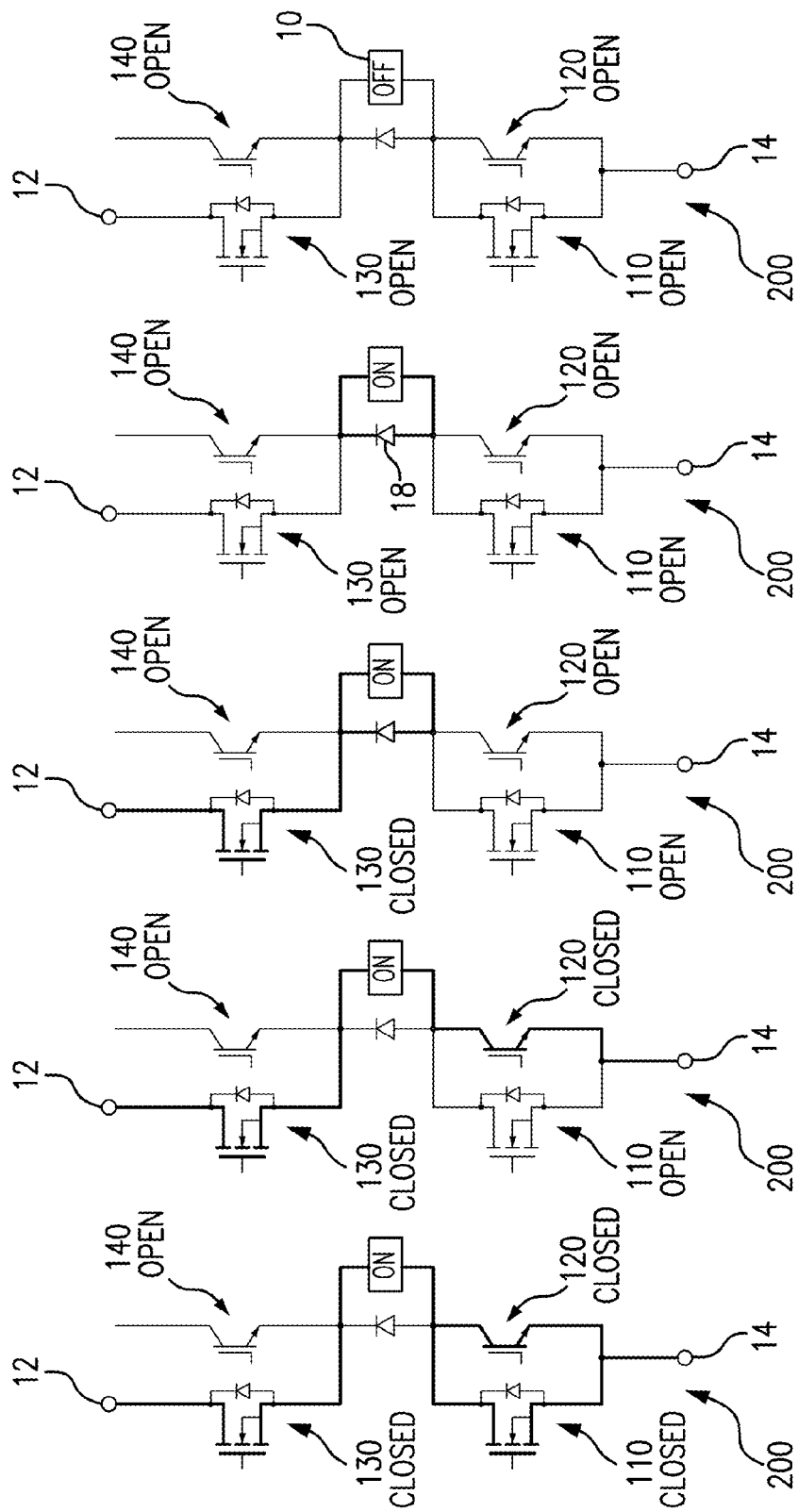

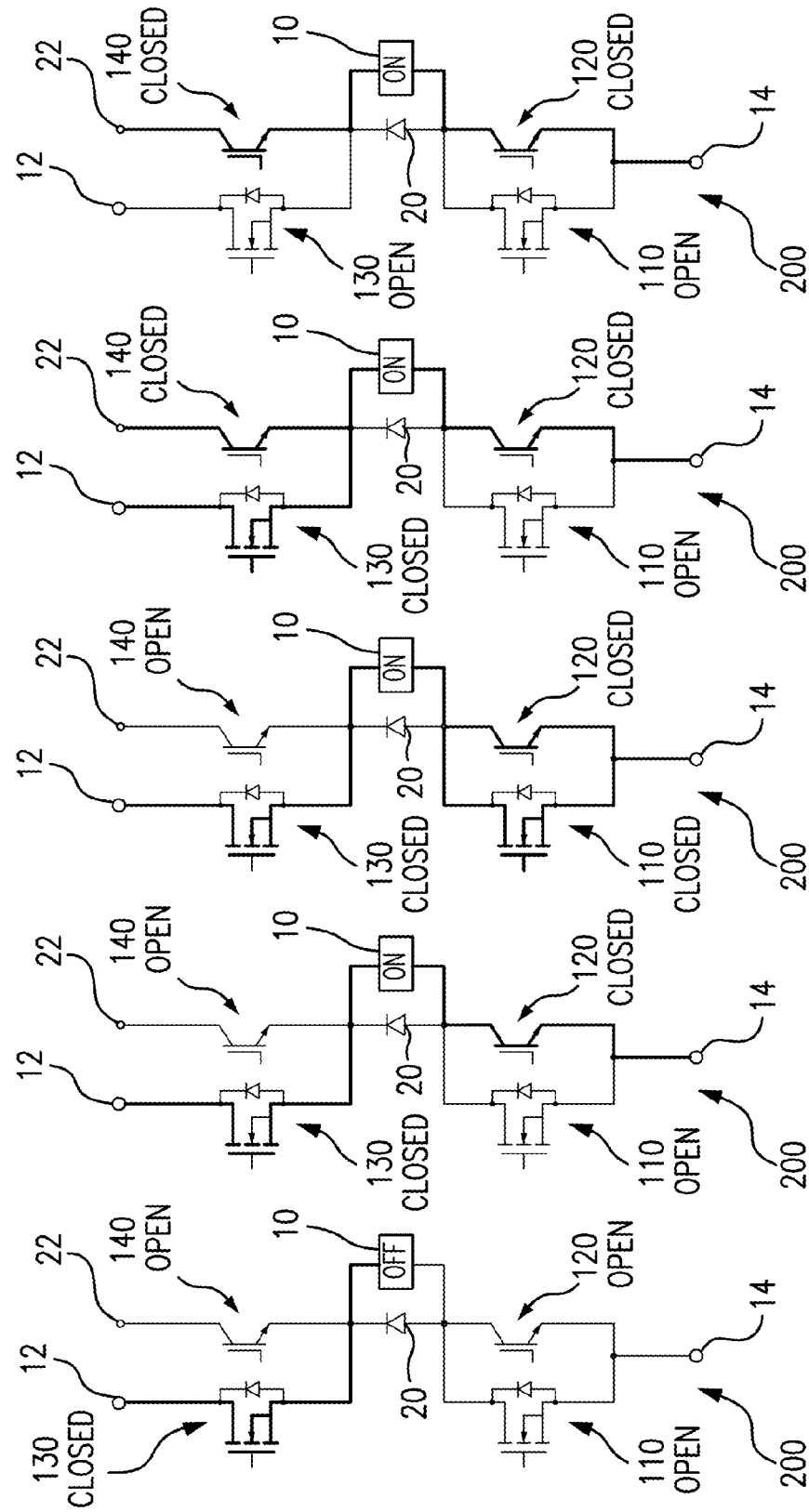

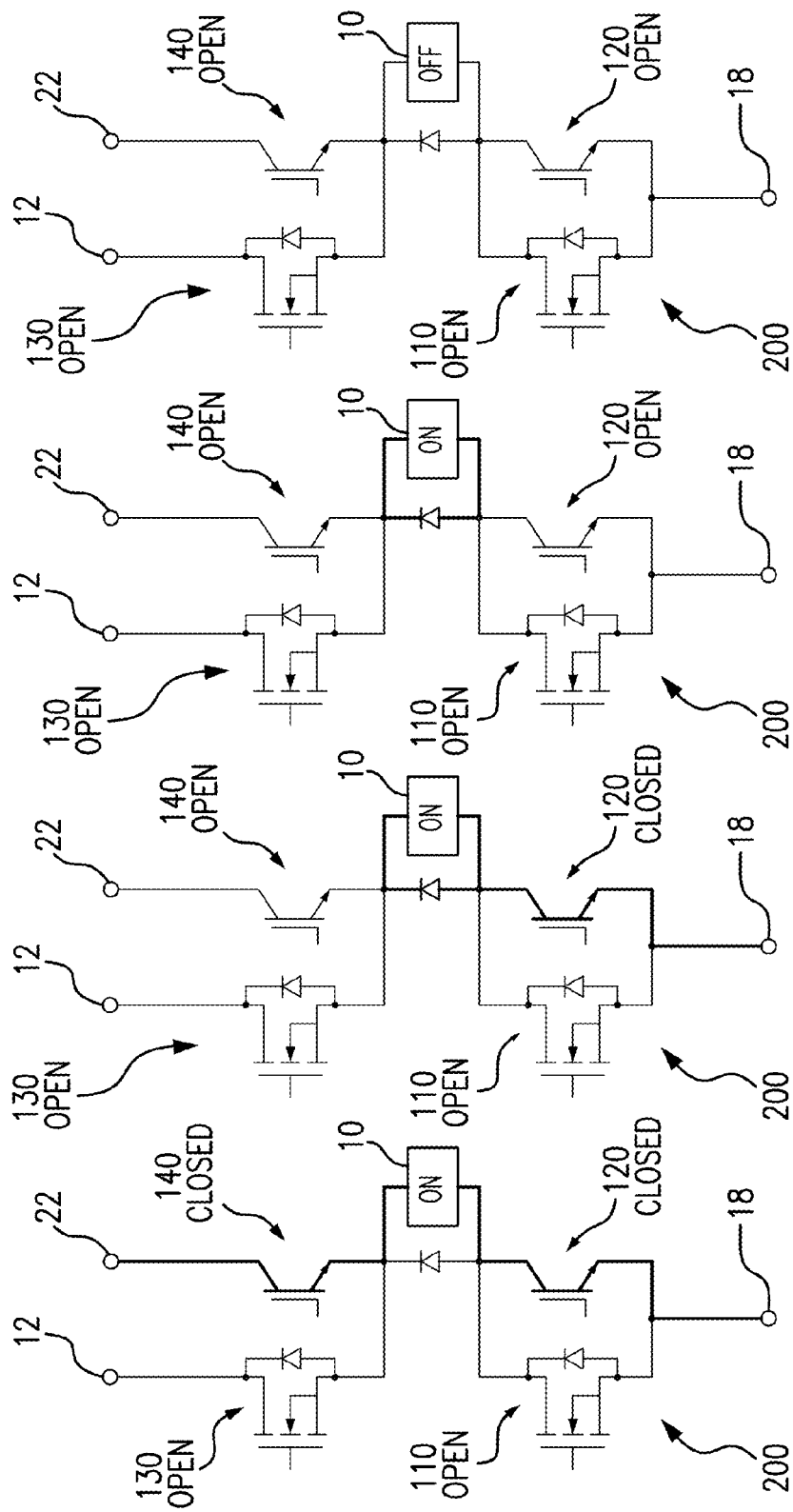

SOLID STATE CIRCUIT-BREAKER SWITCH DEVICES

BACKGROUND OF THE INVENTION

1. Field of the Invention

The subject invention relates to solid state circuit-breaker switches, and more particularly to solid state circuit-breaker switch devices having a first switch arranged between a load and a positive terminal and second switch arranged between the load and a return terminal.

2. Description of Related Art

Hybrid electric vehicles utilize high voltage direct current power management and distribution. Solid state circuit-breaker (SSCB) switches are used in conventional power distribution systems to replace traditional electromechanical circuit-breakers. Their main functions are to distribute power to different loads. Compared to traditional electromechanical circuit-breakers, SSCB switches provide relatively fast response time, eliminate arcing during turn-off transients and bouncing during turn-on transients, and do not suffer performance degradation as a result of repeated fault isolation events. SSCB switches also have lower weight and size than traditional electromechanical circuit-breakers. SSCB switches are also capable of providing advanced protection and diagnostics, more efficient power architectures and packaging techniques.

In order for a SSCB switch to meet the requirements of hybrid vehicles, the SSCB switch needs to (a) have low conduction losses during steady-state operation, (b) have up to 1000% overload capability to meet current to time trip curve characteristics, and (c) be able to tolerate high operating voltages due to inductive spikes that can occur in the system.

Power metal-oxide-semiconductor field-effect-transistors (MOSFETs) are a good choice for such applications due to their low conduction loss (low $R_{DS\text{-}ON}$). Moreover, because of the positive thermal coefficient associated with their on-state resistance, MOSFETs may be easily paralleled to achieve a desired conduction loss during steady-state operation. However, during overload transient conditions MOSFETs may be subject to current unbalance that can cause the device to exceed its peak current and/or continuous thermal rating.

Silicon carbide (SiC) MOSFETs offer reduced conduction losses due to small $R_{DS\text{-}ON}$. However, their relatively small size in comparison with silicon devices for the same rated power increases their heat flux and results in a higher thermal impedance of the packaged device. Moreover, during turn-off events SiC MOSFETs can experience large overvoltage spikes due to their very fast turn-off time and can require additional voltage clamping devices, e.g. snubbers and Zener diodes.

While suitable for their intended purpose, there is a need for improved SSCB switches. There also remains a continuing need for SSCB switches that are easy to make and use. The present invention provides a solution to these problems.

SUMMARY OF THE INVENTION

The subject invention is directed to a new and useful circuit-breaker switch. The circuit-breaker switch includes a first solid state switch connected in series with a second solid state switch. The first solid state switch is configured and adapted to connect to a positive terminal of a high voltage direct current (HVDC) source and the second solid state switch is configured and adapted to connect to a return terminal of the HVDC source. A free-wheeling diode is connected between the first and second solid state switches and is configured and adapted to limit voltage transients across a load at turn-off conditions.

In embodiments, a pair of leads is coupled between the first and second solid state switches and connected to the diode. It is contemplated that the leads are configured and adapted to connect to positive and return terminals of a load in parallel with the diode.

In certain embodiments, the first solid state switch includes a MOSFET device and an integrated bipolar transistor (IGBT) device connected in parallel. A drain of the MOSFET device can be an HVDC current source, a gate of the MOSFET device can connect to a gate drive, and a source of the MOSFET device can couple to the diode. A collector of the IGBT device can connect to the MOSFET drain, an emitter of the IGBT device can connect to the MOSFET source, and the gate can connect to a gate drive. In embodiments, the collector terminal of the IGBT can connect to an auxiliary HVDC terminal in quasi-parallel arrangement with the MOSFET instead of the MOSFET drain.

It is also contemplated that the second solid state switch can include a MOSFET device connected in parallel with an IGBT device. A drain of the MOSFET device can connect to the diode, a source of the MOSFET device can connect to the HVDC return, and a gate of MOSFET device can connect to a gate drive. A collector of the IGBT device can connect to the MOSFET drain, an emitter of the IGBT device can connect to the MOSFET source, and the gate can connect to a gate drive.

In certain embodiments the or at least one of the MOSFET devices is a SiC MOSFET device. In embodiments the or at least one of the IGBT devices is a silicon based IGBT device. It is also contemplated that a diode can connect across the drain and source terminals of the or at least one of the MOSFET devices to limit voltage transients at load turn-off conditions and prevent voltage from exceeding the maximum blocking voltage of the switch.

These and other features of embodiments of the circuit-breaker switch will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the methods and devices disclosed herein without undue experimentation, the methods and devices will be described in detail herein below with reference to certain figures, wherein:

FIGS. 6A-6C are schematic diagrams of the SSCB switch of FIG. 5 during a turn-on sequence while operating within rated current;

FIGS. 7A-7E are schematic diagrams of the SSCB switch of FIG. 5 during a turn-off sequence while operating within rated current;

FIGS. 8A-8E are schematic diagrams of the SSCB switch of FIG. 5 during a turn-on sequence while in overload condition; and FIGS. 9A-9D are schematic diagrams of the SSCB switch of FIG. 5 during a turn-off sequence while in an overload condition.

DETAILED DESCRIPTION OF THE PREFERRED EMBODIMENTS

Figure 1:
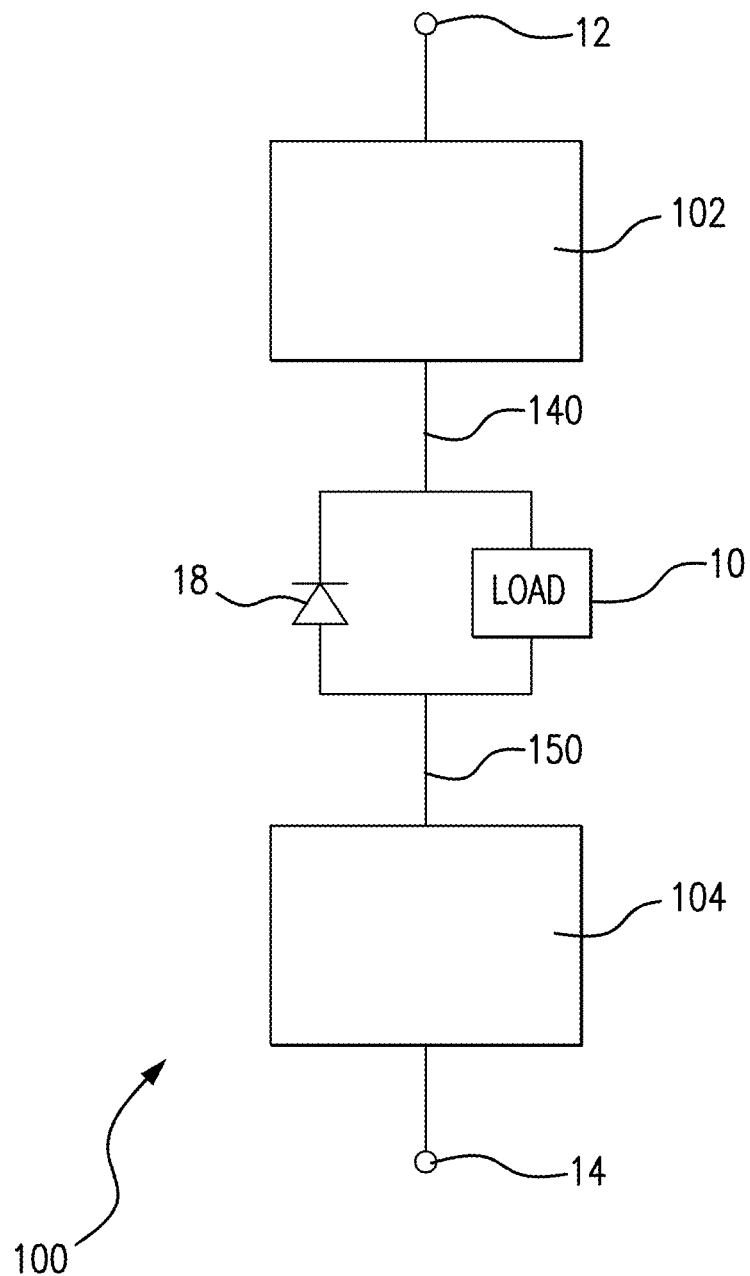
FIG. 1 is a schematic diagram of an SSCB switch according to an embodiment.

Reference will now be made to the drawings wherein like reference numerals identify similar structural features or aspects of the subject invention. For purposes of explanation and illustration, and not limitation, a view of an exemplary embodiment of an SSCB switch in accordance with the invention is shown in FIG. 1 and is designated generally by reference numeral 100. Other embodiments of the SSCB switch in accordance with the invention, or aspects thereof, are provided in FIGS. 2-9, as will be described. The systems and methods of the invention can be used for high voltage DC power management and power distribution, such as in hybrid vehicles for example.

SSCB switch 100 includes a first solid state switch 102 configured and adapted to connect to a positive terminal 12 of an HVDC power source. SSCB switch 100 also includes a second solid state switch 104 connected in series with first solid state switch 102 and configured and adapted to connect to a return terminal 14 of the HVDC power source. A freewheeling diode 18 connects between first and second solid state switches 102 and 104, in series for example, and is configured and adapted to limit voltage transients across a load 10 at turn-off conditions. In certain embodiments, load 10 is an optional component of SSCB switch 100. In the illustrated embodiment, load 10 is a hybrid vehicle load connected in parallel with diode 18. Diode 18 is arranged to allow current flow in one direction and limit current flow in an opposite direction, diode 18 limiting current flow from solid state switch 102 to solid state switch 104 in the illustrated embodiment.

Solid state switch 102 connects to a lead 140 on one end and to an HVDC positive terminal 12 on its other end. Solid state switch 104 connects to a lead 150 and to HVDC return terminal 14 on its other end. HVDC positive terminal 12 and return terminal 14 can have a nominal potential difference (voltage) in the range of about 250 volts to about 1000 volts. Leads 140 and 150 connect load 10 in series with solid state switches 102 and 104. Leads 140 and 150 also connect diode 18 in series with solid state switches 102 and 104.

Figure 2:
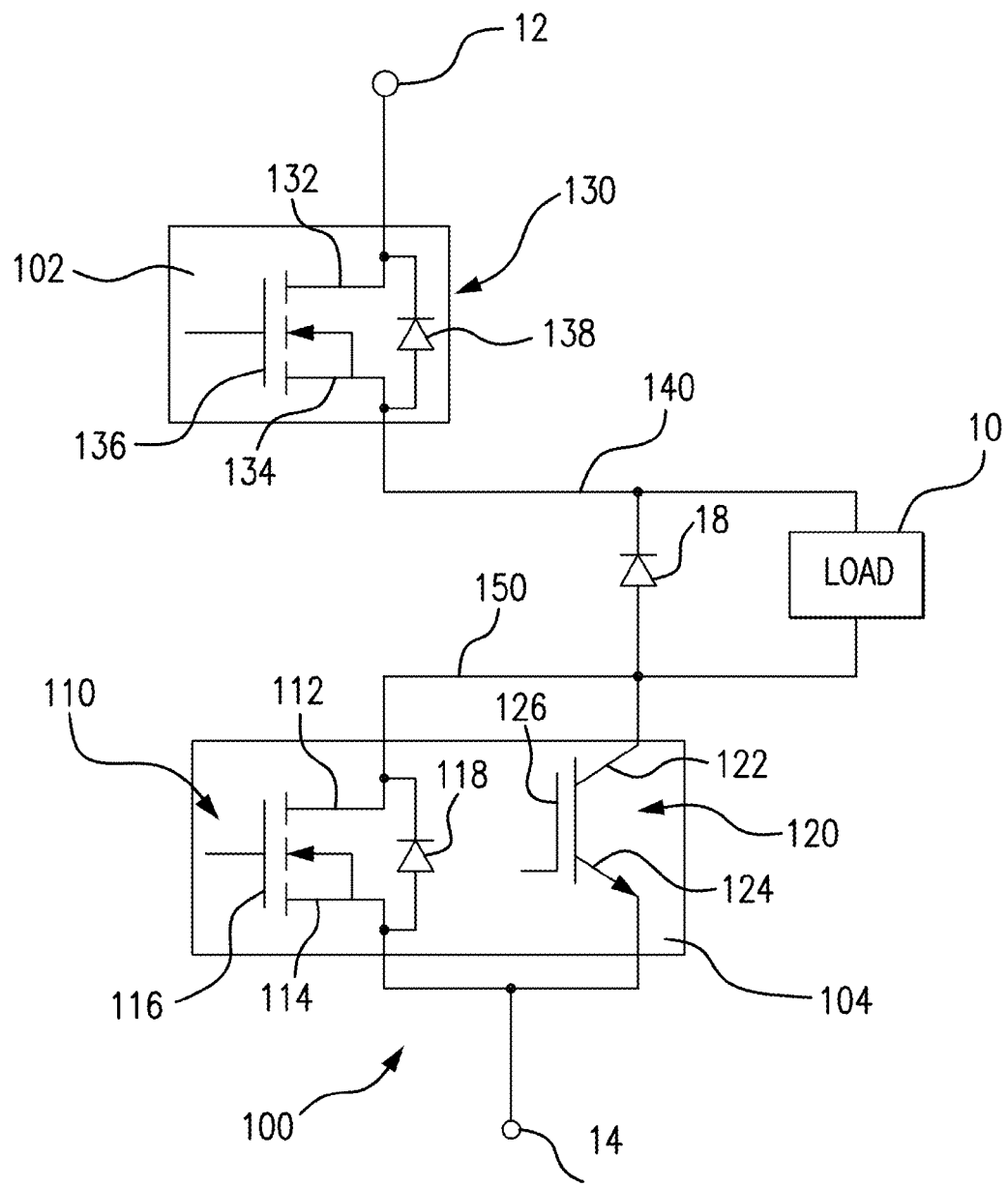
FIG. 2 is schematic diagram of an embodiment of an SSCB switch showing a first switch device arrangement.
Figure 3:
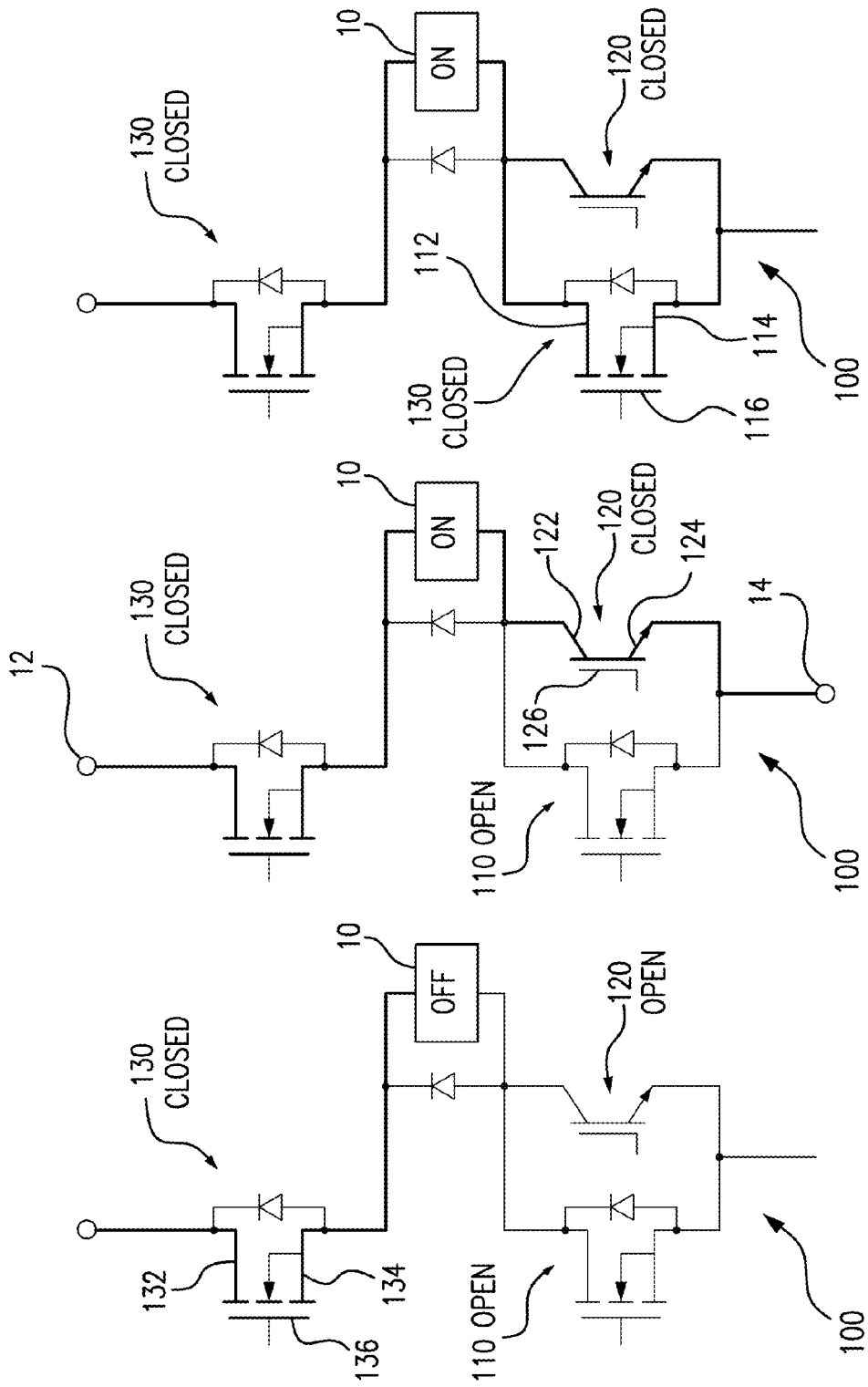
FIGS. 3A-3C are schematic diagrams of the SSCB switch of FIG. 2 during a turn-on sequence.
Figure 4:
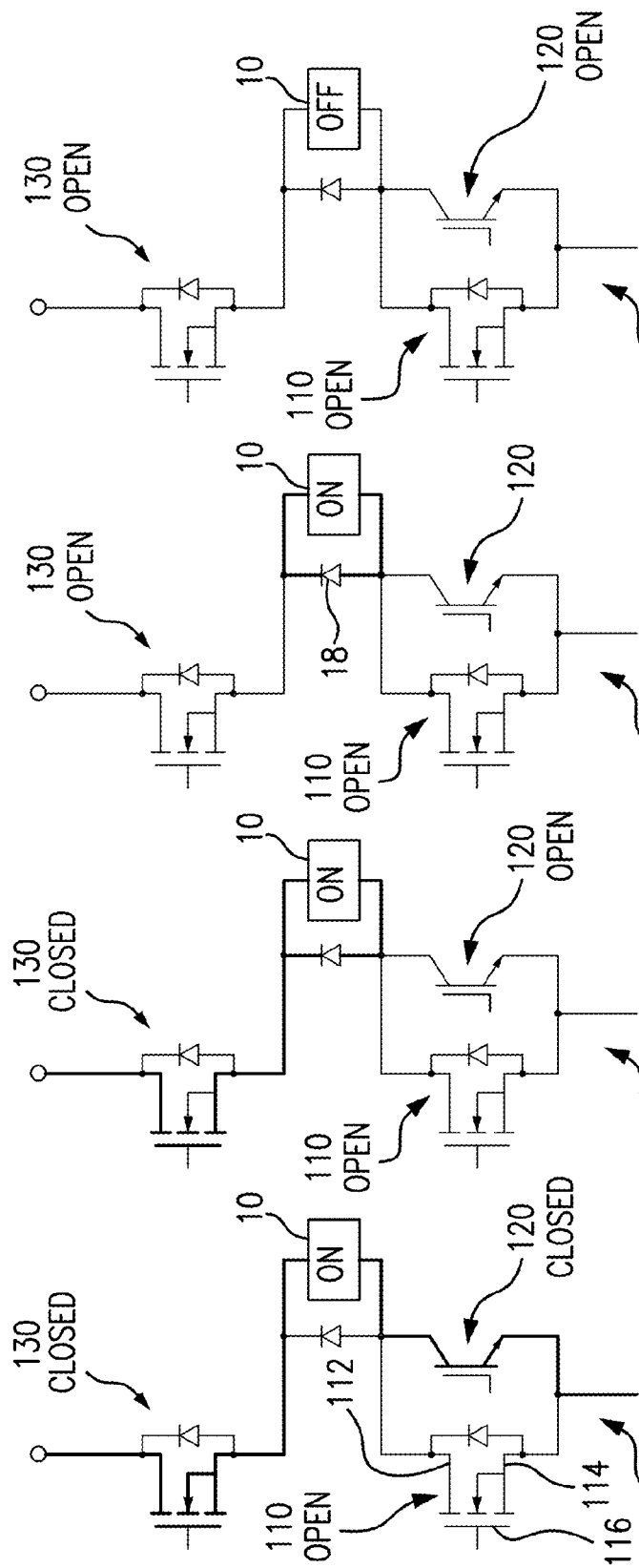
FIGS. 4A-4D are schematic diagrams of the SSCB switch of FIG. 2 during a turn-off sequence.

With reference to FIG. 2, first solid state switch 102 includes at least one MOSFET device 130. Second solid state switch 104 includes at least one MOSFET device 110 connected in parallel with at least one IGBT device 120. As will be appreciated, first and second solid state switches 102 and 104 can include any suitable number of MOSFET devices and IGBT devices connected in parallel as necessary for the voltage of an intended application. In certain embodiments, one of the MOSFET devices 110 and 130 is a silicon carbide MOSFET device. In embodiments the IGBT device 120 is a silicon-based IGBT device. As will also be appreciated, embodiments having a solid state switch with an IGBT device in parallel with a MOSFET device provide a higher current rating and longer turn-off times. It also serves to reduce overvoltage stress on the switch MOSFET device during turn-off events.

MOSFET device 110 includes a drain terminal 112, a source terminal 114, and a gate terminal 116. Drain terminal 112 connects to load 10 through second lead 150. Source terminal 114 connects to HVDC return terminal 14. Gate terminal 116 is configured and adapted to connect to a MOSFET gate drive. IGBT device 120 includes a collector terminal 122, an emitter terminal 124, and gate terminal 126. Collector terminal 122 connects to load 10 through second lead 150 and to source terminal 112 of MOSFET device 110. Emitter terminal 124 connects to HVDC return terminal 14. Gate terminal 126 is configured and adapted to connect to an IGBT gate drive. MOSFET device 130 includes a drain terminal 132, a source terminal 134, and a gate terminal 136. Source terminal 134 connects to load 10 through first lead 140. Drain terminal 132 electrically connects to HVDC positive terminal 12. Gate terminal 136 is configured and adapted to connect to a gate drive.

Gate 126 of IGBT device 120 is configured and adapted to interrupt current flow through IGBT switch 120, thereby turning switch 120 on and off during turn-on and turn-off events. In an exemplary embodiment, IGBT device 120 is configured and adapted to (a) close after MOSFET device 110 closes during a turn-on sequence within rated current operation, (b) open after MOSFET device 110 opens during a turn-off sequence within rated current operation, (c) remain closed after MOSFET device 110 opens during a turn-on sequence in an overload condition, and/or (d) remain closed after MOSFET device 110 opens during a turn-off sequence in an overload condition.

MOSFET device 130 includes a diode 138 connecting drain terminal 132 and source terminal 134. Diode 138 is configured and adapted to limit voltage transients at load turn-off conditions and prevent voltage from exceeding a maximum blocking voltage of the switch. Diode 138 is arranged in parallel across MOSFET device 130 so as to limit current flow from drain terminal 132 to source terminal 134, and to allow current to flow from source terminal 134 to drain terminal 132. Diode 138 is configured and adapted to substantially eliminate a sudden voltage spike seen across MOSFET 130 when it is switched off by providing an alternative current path around MOSFET device 130 when the device is switched off.

MOSFET device 110 similarly includes a diode 118 connecting drain terminal 112 and source terminal 114. Diode 118 is configured and adapted to limit voltage transients at load turn-off conditions and prevent voltage from exceeding a maximum blocking voltage of the switch. Diode 118 is arranged in parallel across MOSFET device 130 so as to limit current flow from drain terminal 112 to source terminal 114, and to allow current flow from source terminal 114 to drain terminal 112. Diode 118 is configured and adapted to substantially eliminate a sudden voltage spike seen across MOSFET 110 when it is switched off by providing an alternative current path when MOSFET 110 is switched off.

Referring to FIGS. 3A-3C, SSCB switch 100 is shown during a turn-on sequence during which MOSFET and IGBT devices 130, 120, and 110 successively close. As will be the convention below, current paths created by closed switches (labeled "CLOSED") are illustrated with heavier line weight than current paths interrupted by open switches (labeled "OPEN") in the illustrated SSCB switches. As will also be the convention in the figures, load 10 will be labeled "ON" and "OFF" to indicate whether current flows through the load in the respective figure.

Initially, MOSFET and IGBT devices 110, 120 and 130 are open and load 10 is off. As shown in FIG. 3A, MOSFET device 130 closes first. This establishes a current path from HVDC positive terminal 12 through MOSFET device 130 to load 10. As shown next in FIG. 3B, IGBT device 120 closes next, establishing a current path from HVDC positive terminal 12 to return terminal 14 through MOSFET device 130, load 10, and IGBT device 120. Current then flows between HVDC positive terminal 12 and return terminal 14, powering load 10. As next shown in FIG. 3C, MOSFET device 110 closes afterwards, creating a second current path from load 10 to HVDC return terminal 14. This provides a soft turn-on of the SSCB switch 100, reducing current flow through IGBT device 120 by splitting the current flowing through load 10 into two smaller flows through MOSFET device 110 and IGBT device 120 subsequent to power being applied to load 10. The sequential turn-on of MOSFET and IGBT devices 130, 120, and 110 illustrated also provides low steady state conduction losses in embodiments having with SiC MOSFET devices as well as low thermal stress and EMI effects due the relatively slow turn-on of IGBT device 120.

Referring now to FIGS. 4A-4D, SSCB switch 100 is shown during a turn-off sequence during which MOSFET and IGBT devices 110, 120, and 130 successively open to power down load 10.

Initially MOSFET and IGBT devices 110, 120, and 130 are closed (shown in FIG. 3C). As shown in FIG. 4A, MOSFET device 110 opens first, interrupting current flow through the device. As next shown in FIG. 4B, IGBT device 120 opens thereafter, interrupting current flow through IGBT device 120 as well as between HVDC positive terminal 12 and HVDC return terminal 14. As shown in FIG. 4C, residual current flows through load 10 owing to parasitic inductance of the load and remaining potential. As will be appreciated, this is a potentially damaging phenomenon of limited duration and temporal in nature. The residual current circulates across load 10 and diode 18 until such time as the voltage drops below the threshold voltage of diode 18. Current flow ceases and load 10 powers completely down (illustrated in FIG. 4D). Advantageously, since MOSFET device 110 opens at near zero voltage there is relatively low overvoltage stress applied to MOSFET device 110 during the sequence.

Figure 5:
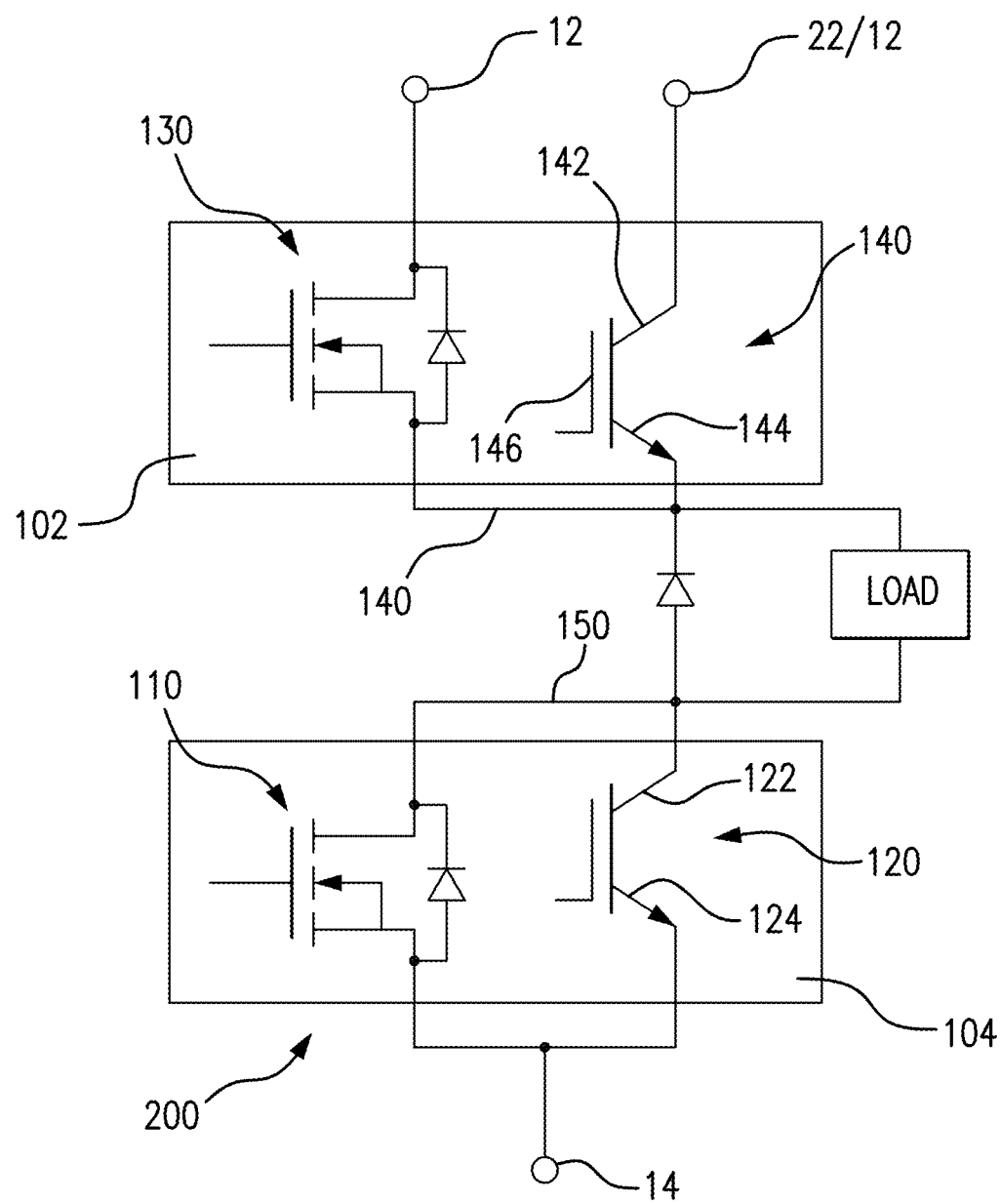
FIG. 5 is schematic diagram of an SSCB switch showing a second SSCB switch device arrangement.

Referring now to FIG. 5, a SSCB switch 200 is shown. SSCB switch 200 is similar to SSCB switch 100 and additionally includes an IGBT device 140 disposed within first solid state switch 102. IGBT device 140 is an auxiliary IGBT device, and includes a collector terminal 142, an emitter terminal 144, and a gate terminal 146. Emitter terminal 144 connects to source terminal of MOSFET device 110. Gate terminal 146 is configured and adapted to connect to a gate drive. In embodiments collector terminal 142 is configured and adapted to be an HVDC positive terminal 12 by connecting to source terminal 132 of MOSFET device 130 (in a parallel arrangement). Collector terminal 142 can alternatively be an auxiliary HVDC positive terminal 22, such as by coupling to a separate HVDC bus (in a quasi-parallel arrangement). Each of these alternative embodiments is illustrated in FIG. 5 with the "12/22" reference numeral appearing at a terminus of collector 142.

As will be appreciated, embodiments including IGBT device 140 connected to a separate HVDC bus provide operational advantages to for loads associated with SSCB switch 200. For example, during overload conditions the main HVDC bus may be subjected to large voltage disturbances affecting other loads on the bus. By providing an auxiliary HVDC power bus the power quality of the main HVDC bus may be improved during overload conditions by supplying HVDC power from the auxiliary power source through IGBT device 140. As will also be appreciated, embodiments connecting IGBT device 140 in parallel with MOSFET device 130 provide a conductive path to load 10 that has high current capacity, which avoids damage during transient events, provides for low conduction losses due to low drain-source resistance during steady-state conditions of MOSFET device 130.

In certain embodiments IGBT device 140 is configured and adapted to (a) close before MOSFET device 130 during a turn-on sequence while in an overload condition, and (b) remain closed while MOSFET device 130 opens during the turn-on sequence while in an overload condition. This enables the SSCB switch to provide current to load 10 for continued operation and prevents damage to MOSFET device 130 in the condition. IGBT device 140 may also co-operate with IGBT device 120 in an overload condition, IGBT devices 120 and 140 defining current paths during turn-on of SSCB switch 200 while in an overload condition.

In certain embodiments IGBT device 140 is configured and adapted to (a) remain closed until after MOSFET device 130 opens during a turn-off sequence while in an overload condition, and (b) co-operate with IGBT device 120 to define a current path through SSCB switch 200 during the turn-off event. This supplies current to load 10 for continued operation during the overload condition and prevents damage to MOSFET devices 110 and 130 during turn-off events in overload condition.

Referring now to FIGS. 6A-6C, a turn-on sequence of SSCB switch 200 within rated current is shown. The illustrated turn-on sequence is similar to that described in FIGS. 3A-3C, and additionally shows IGBT device 140 remaining open during the sequence. As shown in FIGS. 6A and 6B, a first current path is established from HVDC positive terminal 12 to HVDC return terminal 14 through load 10 by sequential closures of MOSFET and IGBT devices 130 and 120. As shown in FIG. 6C, a second current path is thereafter established from load 10 to HVDC return terminal 12 through MOSFET device 110 by closure of the device. The illustrated sequence provides advantages similar as described above in connection with SSCB switch 100.

Referring now to FIGS. 7A-7E, a turn-off sequence of SSCB switch 200 within rated current is shown. The illustrated sequence is similar to the turn-off sequence illustrated in FIGS. 4A-4D, and additionally shows IGBT device 140 remaining open during the sequence. MOSFET device 110 opens first (shown in FIG. 7B), interrupting current flow through the device. IGBT device 120 opens next as shown in FIG. 7C, interrupting current flow between HVDC positive terminal 12 and HVDC return terminal 14. MOSFET device 130 then opens (shown in FIG. 7D), interrupting the current path between HVDC positive terminal 12 and load 10. Residual current dissipates as described above through diode 18 and advantages similar to those described above in connection with SSCB switch 100 are realized.

Referring now to FIGS. 8A-8E, a turn-on sequence of SSCB switch 200 in an overload condition is shown. The turn-on operation illustrated in FIGS. 8A-8E is similar to turn-on operation during within rated operation shown in FIGS. 3A-3C, and additionally includes the switching events illustrated in FIGS. 8D and 8E. As shown in FIG. 8D, IGBT device 140 closes in response to the overload condition. Closure of IGBT device 140 establishes a second current path from HVDC positive terminal 12/22 to load 10, reducing current flow to load 10 from HVDC positive terminal 12 through MOSFET device 130. This relieves stress on MOSFET device 130 and avoids overload damage to MOSFET device 130. As shown in FIG. 8D, MOSFET device 110 opens in response to the overload condition. This interrupts current flow through MOSFET device 110 and preventing damage to the device due to excessive current flow through the device. As shown in FIG. 8E, MOSFET device 130 opens next, interrupting current flow through the device and further protecting it from damage from the overload condition.

Operatively, the switch configurations adopted by SSCB switch 200 illustrated in FIGS. 8D and 8E allow for continued supply of current to load 10 in the overload condition for a limited period of time by allowing continued current flow through MOSFET and IGBT devices 130, 140, and 120. They also provide power to load 10 through IGBT devices 120 and 140. They further avoid excessive current flow through the MOSFET devices 110 and 130 that otherwise could damage the MOSFETs, preventing damage to the switch devices.

Referring now to FIGS. 9A-9D, a turn-off sequence of SSCB switch 200 in an overload condition is shown. MOSFET devices 110 and 130 open first, protecting the MOSFET device from damage, while IGBT devices 120 and 140 provide an electrical path between HVDC positive terminal 12/22 and HVDC return terminal 18. This protects SSCB switch 200 devices from overload damage and provides for continued operation of load 10 in the overload condition.

As shown in FIG. 9B, IGBT device 140 opens next, interrupting current flow between the HVDC positive terminal 12/22 and HVDC return terminal 18. IGBT device 120 remains closed for a short interval of time and allowing dissipation of a portion of residual current flow through load 10. As shown in FIG. 9C, IGBT switch 120 then opens, interrupting residual current flow from load 10. Remaining residual current flow cycles through load 10 and diode 18 until such time as the residual voltage drops below the threshold voltage of the diode, at which point current flow ceases and load 10 powers off (illustrated in FIG. 9D). As will be appreciated, the operations illustrated in FIGS. 9A-9D by the IGBT and MOSFET devices allow for turn-off at above rated current while limiting potential damage to the MOSFETs by the overload condition.

Embodiments of SSCB switch described herein include a pair of SiC MOSFETs connected in series with a Si IGBT connected in parallel with one of the MOSFET devices. Such embodiments provide low conduction loss (low $R_{DS\text{-}ON}$). The MOSFETs can also be paralleled to achieve low conduction loss during steady-state because of their positive thermal coefficient of their on-state resistance. Embodiments of SSCB switches described herein include the minimum number of power MOSFET devices connected in parallel to meet main switch power loss requirements during steady state. Moreover, since the IGBT switch has a higher current rating and has a longer turn-off time, such SSCB switches have a longer turn-off time. This results in lower overvoltage stress during device turn-off.

Embodiments of SSCB switches described herein also have low conduction losses during steady-state operations. They may are to be able to withstand considerable current overload. Embodiments can withstand up to 1000% overload, thereby meeting current to time trip curve characteristics and tolerating high operating voltage transients from inductive spikes and reflections in hybrid vehicle systems. Such overload transients and/or current unbalances could otherwise cause a MOSFET device of a conventional SSCB switch to exceed its peak current rating or continuous thermal rating due to MOSFET device parameter mismatch, e.g. on-resistance, threshold voltage, gain factor, gate-to-drain (Miller) or gate-to-source capacitance mismatch, gate drive parameter mismatch, e.g. decoupling resistor or gate loop inductance, or power circuit parameter mismatch, e.g. branch inductance or source inductance common to power and gate drive circuit, thereby damaging the SSCB switch device. Moreover, such SSCB switches can have extremely fast response times. They also can withstand the extremely high current and voltages, high operating temperatures, and harsh conditions endured by hybrid vehicles such as military hybrid electric vehicles.

The methods and systems of the present invention, as described above and shown in the accompanying drawings, provide for a SSCB switch with superior properties including switch protection during turn-on and turn-off at above rated current. While the apparatus and methods of the subject invention have been shown and described with reference to preferred embodiments, those skilled in the art will readily appreciate that changes and/or modification may be made thereto without departing from the spirit and scope of the subject invention.

What is claimed is:

1. A circuit-breaker switch, comprising:
a first solid state switch configured and adapted to connect to a positive terminal of a high voltage direct current (HVDC) power source;
a second solid state switch in series with the first solid state switch and configured and adapted to connect to a return terminal of the HVDC power source; and
a free-wheeling diode connected between the first and second solid state switches and in parallel with a load, wherein the free-wheeling diode is configured and adapted to limit voltage transients across a load at turn-off conditions,
wherein the free-wheeling diode provides the only pathway between the first and second solid state switches,
wherein the second solid-state switch includes a MOSFET in parallel with an IGBT to reduce overvoltage stress during device turnoff.

2. A circuit-breaker switch as recited in claim 1, further comprising a pair of leads for connecting the load in series between the first and second solid state switches.

3. A circuit-breaker switch as recited in claim 1, wherein the MOSFET of the second solid state switch is a silicon carbide MOSFET.

4. A circuit-breaker switch as recited in claim 1, wherein the IGBT of the second solid state switch is a silicon based IGBT.

5. A circuit-breaker switch as recited in claim 1, wherein the MOSFET of the second solid state switch includes a source terminal configured and adapted to be an HVDC return terminal, a drain terminal configured and adapted for connection to a return terminal of the load, and a gate terminal configured and adapted for connection to a MOSFET gate drive.

6. A circuit-breaker switch as recited in claim 5, wherein the IGBT of the second solid state switch includes a collector terminal connected to the drain terminal of the MOSFET of the second solid state switch, an emitter terminal connected to the source terminal of the MOSFET of the second solid state switch, and a gate terminal configured and adapted for connection to an IGBT gate drive.

7. A circuit-breaker switch as recited in claim 1, wherein the second solid state switch includes a diode connecting the drain and source terminals of the MOSFET of the second solid state switch, and wherein the diode is configured and adapted to limit voltage transients at load turn-off conditions and prevent voltage from exceeding a maximum blocking voltage of the switch.

8. A circuit-breaker switch as recited in claim 1, wherein the first solid state switch comprises a MOSFET and an IGBT connected in parallel.

9. A circuit-breaker switch as recited in claim 8, wherein the MOSFET of the first solid state switch is a silicon carbide MOSFET.

10. A circuit-breaker switch as recited in claim 8, wherein the IGBT of the first solid state switch is a silicon based IGBT.

11. A circuit-breaker switch as recited in claim 8, wherein the MOSFET of the first solid state switch includes a drain terminal configured and adapted to be an HVDC positive terminal, a source terminal configured and adapted for connection to a positive terminal of the load, and a gate terminal configured and adapted for connection to a MOSFET gate drive.

12. A circuit-breaker switch as recited in claim 11, wherein the IGBT of the first solid state switch includes a collector terminal connected to the HVDC positive terminal, an emitter terminal connected to the source terminal of the MOSFET of the first solid state switch, and a gate terminal configured and adapted for connection to an IGBT gate drive.

13. A circuit-breaker switch as recited in claim 8, wherein the collector terminal of the IGBT of the first solid state switch is configured and adapted to be an auxiliary HVDC positive terminal.

14. A circuit-breaker switch as recited in claim 8, wherein the first solid state switch includes a diode connecting the drain and source terminals of the MOSFET of the first solid state switch, and wherein the diode is configured and adapted to limit voltage transients at load turn-off conditions and prevent voltage from exceeding a maximum blocking voltage of the switch.

\* \* \* \* \*